United States Patent [19]

Suzuki et al.

[11] Patent Number: 4,983,499
[45] Date of Patent: Jan. 8, 1991

[54] METHOD OF FORMING WAVEGUIDE LENS HAVING REFRACTIVE INDEX DISTRIBUTION

[75] Inventors: Makoto Suzuki, Nagoya; Shoji Yamada, Aichi; Kazunari Taki, Nagoya; Akihiro Suzuki, Nishio, all of Japan

[73] Assignee: Brother Kogyo Kabushiki Kaisha, Japan

[21] Appl. No.: 469,682

[22] Filed: Jan. 25, 1990

Related U.S. Application Data

[63] Continuation of Ser. No. 93,703, Sep. 8, 1987, abandoned.

[30] Foreign Application Priority Data

Sep. 11, 1986 [JP] Japan .................. 61-214705

[51] Int. Cl.⁵ .................. G03C 5/00; B05D 5/06; G02B 6/10
[52] U.S. Cl. .................. 430/321; 430/324; 430/327; 350/96.1; 350/96.12; 156/659.1; 427/162; 427/383.5; 148/DIG. 30
[58] Field of Search .............. 430/321, 323, 324, 394, 430/327, 320; 250/492.3; 350/417, 96.3, 96.12, 96.31, 96.16, 96.19, 96.1, 96.15, 96.17, 96.18; 156/659.1, 656, 657, 661.1, 653, 643, 644; 148/DIG. 30; 427/162, 383.5, 389.1, 383.3

[56] References Cited

U.S. PATENT DOCUMENTS

| | | | |
|---|---|---|---|
| 3,795,433 | 3/1974 | Channin | 350/96.14 |
| 3,841,733 | 10/1974 | Ebersole | 350/96.14 |
| 3,870,394 | 3/1975 | Ploeckl | 350/6.8 |
| 3,884,549 | 5/1975 | Wang et al. | 350/96.12 |
| 3,891,302 | 6/1975 | Dabby et al. | 350/96.12 |
| 3,893,856 | 7/1975 | Bestenreiner et al. | 430/321 |
| 4,000,937 | 1/1977 | Kaminow | 350/96.14 |
| 4,070,092 | 1/1978 | Burns | 350/96.14 |
| 4,175,827 | 11/1979 | McMahon | 350/96.14 |
| 4,262,996 | 4/1981 | Yao | 350/96.19 |
| 4,332,879 | 6/1982 | Pastor et al. | 430/321 |
| 4,343,890 | 8/1982 | Phillips et al. | 430/321 |
| 4,348,079 | 9/1982 | Johnson | 350/358 |
| 4,375,312 | 3/1983 | Tangonan | 430/321 |
| 4,396,246 | 8/1983 | Holman | 350/96.14 |
| 4,413,270 | 11/1983 | Sprague | 346/160 |

(List continued on next page.)

FOREIGN PATENT DOCUMENTS

| | | | |
|---|---|---|---|
| 0021993 | 6/1980 | European Pat. Off. | |
| 0021510 | 1/1981 | European Pat. Off. | |
| 0050545 | 10/1981 | European Pat. Off. | |
| 0048441 | 3/1982 | European Pat. Off. | |
| 0186166 | 12/1985 | European Pat. Off. | 350/96.12 |
| 2359797 | 12/1977 | Fed. Rep. of Germany | |
| 3102972 | 11/1981 | Fed. Rep. of Germany | |
| 3443863 | 6/1985 | Fed. Rep. of Germany | |
| 51-8949 | 1/1976 | Japan | |
| 54-150153 | 11/1979 | Japan | |
| 0040452 | 3/1980 | Japan | 350/96.12 |
| 56-165122 | 12/1981 | Japan | |
| 0106503 | 6/1983 | Japan | 430/321 |
| 58-1250257 | 7/1983 | Japan | |
| 58-147718 | 9/1983 | Japan | |
| 59-204027 | 11/1984 | Japan | |
| 2133900 | 8/1984 | United Kingdom | |

OTHER PUBLICATIONS

Osamu Mikami, "LiNbO₃ Coupled-Waveguide TE/TM Mode Splitter", *Applied Physics Letters*, vol. 36, No. 7, Apr. 1980, pp. 491–493 (350/96.14).

(List continued on next page.)

*Primary Examiner*—Ellis P. Robinson
*Assistant Examiner*—Donald J. Loney
*Attorney, Agent, or Firm*—Oliff & Berridge

[57] ABSTRACT

A method of forming on a substrate a waveguide lens having a predetermined distribution of refractive index, for converging or diverging light rays which propagate through a two-dimensional waveguide formed on a surface of the substrate. The method includes a step of forming a film of a diffusion metal having a constant thickness, a step of removing local portions of said film, by using a mask so that a density of the removed local portions of the film per unit area is continuously varied, and a step of effecting thermal diffusion of the remainder of the film into the substrate. Alternatively, the method includes a step of forming a mask having a multiplicity of separate openings whose density per unit area is continuously varied, a step of exposing a multiplicity of separate exposed areas of the substrate aligned with the separate openings to a material which serves to change a refractive index of the substrate, and a step of moving the material from the surface of the substrate into its interior.

7 Claims, 4 Drawing Sheets

U.S. PATENT DOCUMENTS

| | | | |
|---|---|---|---|
| 4,425,023 | 1/1984 | Matsumoto et al. | 350/96.14 |
| 4,440,468 | 4/1984 | Auracher et al. | 350/96.12 |
| 4,445,759 | 5/1984 | Valette | 350/96.12 |
| 4,468,084 | 8/1984 | Hutcheson | 350/96.11 |
| 4,470,661 | 9/1984 | Matsumoto | 350/96.13 |
| 4,478,483 | 10/1984 | Sprague | 350/96.14 |
| 4,492,970 | 1/1985 | Lee | 346/160 |
| 4,523,803 | 6/1985 | Arao | 350/96.13 |
| 4,547,262 | 10/1985 | Spillman et al. | 350/96.12 |
| 4,548,464 | 10/1985 | Auracher et al. | 350/96.14 |
| 4,554,050 | 11/1985 | Minford et al. | 156/664 |
| 4,637,681 | 1/1987 | Yamamoto et al. | 350/96.12 |
| 4,649,101 | 3/1987 | Thiel et al. | 430/324 |
| 4,686,162 | 8/1987 | Stangl et al. | 430/321 |
| 4,693,548 | 9/1987 | Tsunoi | 350/96.13 |

OTHER PUBLICATIONS

Delavaux et al., "Fundamental Limitations in the Performance of Chirped Grating Lenses on Planar Optical Waveguides", 8106 *IEEE Journal of Quantum Electronics*, QE–21, No. 1, Jan. 1985, pp. 86–93.

Matsunaga et al., "Optical Waveguide Isolator in Ti--Diffused $LiNbO_3$", *Optics Communications*, Dec. 1978, vol. 27, No. 3, pp. 361–364.

Tsao et al., "Photodeposition of Ti and Application to Direct Writing Of Ti: $LiNbO_3$ Waveguides", *Appl. Phys. Lett.*, vol. 42, No. 7, Apr. 1983, pp. 559–561.

Takizawa, "Electrooptical Fresnel Lens . . . ", *Applied Optics*, vol. 22, No. 16, Aug. 15, 1983, pp. 2468–2473.

METHOD OF FORMING WAVEGUIDE LENS HAVING REFRACTIVE INDEX DISTRIBUTION

This is a continuation of application Ser. No. 07/093,703 filed Sept. 8, 1987 now abandoned.

BACKGROUND OF THE INVENTION

The present invention relates to a method of forming a waveguide lens having a predetermined distribution of refractive index.

Known waveguide lenses formed in a two-dimensional waveguide on a substrate having an optical integrated circuit formed thereon include: a mode index lens which is formed by diffusion of an impurity into a region 50 of the surface of a substrate 10, which region 50 has a configuration similar to the cross sectional shape of an ordinary convex lens, as indicated in FIG. 6; a geodesic lens which is produced by first forming a small part-spherical concavity 52 in the surface of the substrate 10, and then forming a two-dimensional waveguide 12 over the entire surface of the substrate 10, as indicated in FIG. 7; and a fresnel lens which is formed by diffusion of an impurity into a region 54 of a surface of the substrate 10, which region 54 has a shape similar to the cross sectional shape of an ordinary fresnel lens, as indicated in FIG. 8. However, the above types of lenses have respective drawbacks. More specifically, with the mode index lens it is inherently difficult to obtain a sufficiently small F number, and the geodesic lens suffers from difficulty in forming the part-spherical concavity 52. Further, the fresnel lens tends to have a high degree of scattering of an incident light.

On the other hand, it is proposed to form a waveguide lens on a substrate, as shown in FIG. 1, so that the refractive index of the lens continuously changes in a direction intersecting a direction of propagation of a light beam. The waveguide lens having a refractive index distribution thus formed exhibits comparatively excellent optical properties, even if the size of the lens is relatively small, and is therefore free of the drawbacks as encountered with the known types of lens discussed above.

A conventional method for producing such a waveguide lens having a refractive index distribution requires a step of forming a thin film 56 of a suitable diffusion metal which is deposited on the surface of the substrate 12, for diffusion of the metal into the substrate in a subsequent step. However, as shown in FIG. 9 by way of example, the diffusion metal film 56 must have a continuously varying thickness, so that the density of the metal diffusion within the substrate is continuously changed. Since the thickness of the metal film 56 is inherently small, it is difficult to accurately control the thickness of the thin film 56 so that a variation of the thickness exactly corresponds to the desired distribution of refractive index of the waveguide lens to be obtained. Therefore, the above method has been found difficult to practice for large-scale production of such waveguide lenses without a fluctuation in the refractive index distribution from one lens to another.

SUMMARY OF THE INVENTION

It is accordingly an object of the present invention to provide a method by which a waveguide lens can be comparatively easily formed on a substrate, with improved accuracy of refractive index distribution.

The above object may be achieved according to one aspect of the present invention, which provides a method of forming on a substrate a waveguide lens having a predetermined distribution of refractive index, for converging or diverging light rays which propagate through a two-dimensional waveguide formed on a surface of the substrate, comprising the steps of: (a) forming a film of a diffusion metal having a constant thickness, in a region of the surface of the substrate in which the waveguide lens is formed; (b) removing local portions of the metal film, by using a mask which has a multiplicity of separate openings which correspond to the local portions of the film, so that a density of the removed local portions of the film per unit area of the region of the surface of the substrate is continuously varied; and (c) effecting thermal diffusion of the remainder of the film into the substrate, to thereby form the waveguide lens having the predetermined distribution of refractive index.

According to the method of the invention described above, the film of the diffusion metal having a constant thickness is formed in a selected region of the surface of the substrate where the waveguide lens is formed. Local portions of this metal film which correspond to the separate openings of the mask are removed. The remaining portion of the metal film is then diffused into the substrate, whereby the portion of the two-dimensional waveguide corresponding to the above-indicated region of the substrate is given a refractive index distribution, and thereby enabled to function as a lens. Thus, the instant method does not require forming a thin film of a diffusion metal whose thickness is continuously varied in exact agreement with a desired distribution of refractive index of the lens to be obtained. In the instant method, slits, grooves or holes are formed as a result of removing the local portions of the metal film. Namely, the density of the slits per unit area of the metal film determines a distribution of refractive index of the waveguide lens. Since the spacings between the adjacent slits, for example, may be comparatively easily and accurately controlled, the instant method is suitable for large-scale production of waveguide lenses with a minimum deviation of the refractive index from the nominal distribution curve.

According to another aspect of the invention, there is provided a waveguide lens having a predetermined distribution of refractive index, for converging or diverging light rays which propagate through a two-dimensional waveguide formed on a surface of the substrate, comprising the steps of: (a) forming a mask in a region of the surface of the substrate in which the waveguide lens is formed, the mask having a multiplicity of separate openings whose density per unit area of the region is continuously varied; (b) exposing a multiplicity of separate exposed areas of the region of the surface of the substrate which are aligned with the separate openings, to a material which serves to change a refractive index of the substrate if the material exists in the substrate; and (c) moving the material from the surface of the substrate into an interior of the substrate.

In the instant method, the areas of the surface of the substrate aligned with the separate openings of the mask are exposed to the material for changing the refractive index of the substrate. This material is moved from the surface of the substrate into the interior of the substrate. Since the density of the separate areas of the substrate exposed to the material is continuously varied in the above-indicated region, the portion of the two-dimensional waveguide of the substrate corresponding to the above region is enabled to function as a lens, which has a distribution of refractive index which corresponds to the continuously varying density of the areas exposed to the material.

According to one advantageous feature of the above aspect of the invention, the step of moving the material is achieved by effecting thermal diffusion of the material into the interior of the substrate. Alternatively, the same step may be achieved by moving ions of the material which serve to change the refractive index of the substrate into the interior of the substrate, while moving ions of the substrate which are replaced by the ions of the material toward the surface of the substrate.

According to another feature of the method described above, the step of forming the mask comprises forming a photo resist coating over the above-indicated region of the surface of the substrate, covering the photo resist coating with a photomask which has a multiplicity of masking portions, and removing non-masked portions of the photo resist coating, to thereby form the mask which has the multiplicity of separate openings defined by the removed portions of the photo resist coating.

According to further features of the above method, the step of exposing the multiplicity of separate exposed areas of the above-indicated region of the substrate to the material comprises depositing the material on the separate exposed areas, or alternatively, immersing the substrate in a solution containing the material.

BRIEF DESCRIPTION OF THE DRAWINGS

In the accompanying drawings, there are shown, for illustrative purpose only, presently preferred embodiments of the invention, from which the above and optional objects, features and advantages of the invention will be readily apparent.

In the drawings.

DETAILED DESCRIPTION OF THE PREFERRED EMBODIMENTS

Figure 1:
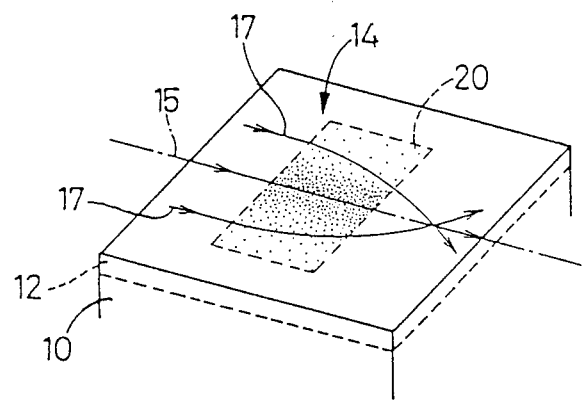
FIG. 1 is a perspective view showing one example of a waveguide lens having a refractive index distribution, manufactured according to the present invention.

Referring first to FIG. 1, there is shown a substrate 10 consisting of a single Z-cut crystal of lithium niobate ($LiNbO_3$), for example. On one of opposite major surfaces of this substrate 10, there is formed a two-dimensional waveguide 12. The portion of the substrate 10 which constitutes the waveguide 12 has a higher refractive index than the other portion, so that a light beam propagating through the waveguide 12 is trapped in the direction of thickness of the waveguide, whereby the light beam is guided along the plane of the substrate 10. On the surface of the waveguide 12 of the substrate 10, there is formed a waveguide lens 14 which has a predetermined refractive index distribution. The refractive index of the waveguide lens 14 continuously changes in a direction which intersects the direction of propagation of the light beam guided by the two-dimensional waveguide 12. More specifically, the refractive index of the lens 14 increases in opposite directions toward a centerline (optical axis) 15 thereof, so that the lens 14 functions as a convex lens capable of converging light rays 17 which have passed through the lens. In FIG. 1, the density of dots represents the refractive index of the waveguide lens 14.

There will next be described a process of forming the waveguide lens 14.

Figure 2:
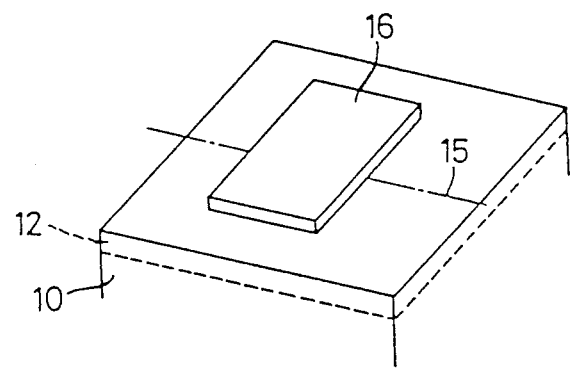
FIGS. 2 and 3 are perspective views for explaining steps of forming the waveguide lens of FIG. 1.

In an initial step of the process, the substrate 10 formed with the two-dimensional waveguide 12 is prepared. Then, a thin film 16 of titanium (Ti) having a desired thickness is deposited, by a suitable thin-film forming method such as vapor deposition or sputtering, in a rectangular region 20 of the surface of the substrate 10 (waveguide 12) in which the waveguide lens 14 is to be formed. FIG. 2 shows the thin titanium film 16 thus deposited on the substrate 10.

Figure 3:
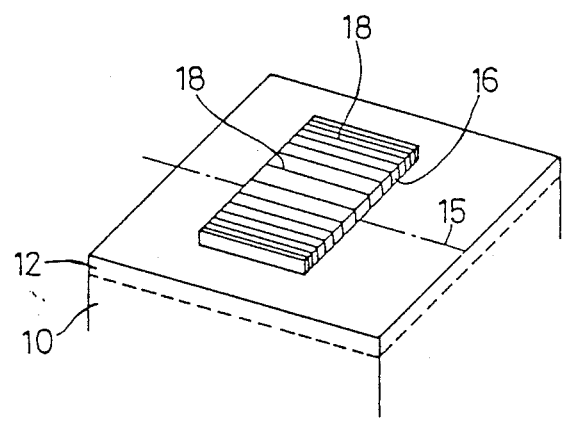

In the next step, a multiplicity of slits 18 having a thickness of about 1-5 microns for example are formed through the thin titanium film 16, in a well known photo-etching process. Described more particularly, a photo resist coating is applied over the titanium film 16, and the resist coating is exposed to a light through a photomask which has masking portions corresponding to the slits 18. As a result, the non-masked exposed portions of the photo resist coating are cured or hardened. Then, the masked uncured portions of the photo resist coating are removed, and consequently separate openings defined by the remaining cured portions are formed in the photo resist coating, so that the corresponding local portions of the titanium film 16 are exposed, i.e., not covered by the photo resist coating. Subsequently, the exposed local portions of the titanium film 16 corresponding to the separate openings in the photo resist coating are removed by corrosion by a suitable etchant. In this respect, the photo resist coating having the separate openings corresponding to the masking portions of the photomask is considered to be a mask for selectively removing local portions of the titanium film 16. Then, the cured portions of the photo resist coating remaining on the film 16 are removed. Thus, the slits 18 are formed by removal of its selected local portions, as illustrated in FIG. 3. The thicknesses of the slits 18, and the number of the slits 18 are selected as needed. In other words, the titanium film 16 is divided by the slits 18 into a multiplicity of small separate segments. The slits 18 serve to continuously change the diffusion density of titanium in the two-dimensional waveguide 12. The number and interval of the slits 18 are suitably determined so as to obtain a desired distribution of the diffusion density of titanium. Namely, the distribution of area of the slits 18 formed in the titanium film 16 provides a continuous change or variation in the density of titanium per unit area of the surface of the substrate 10 (waveguide 12), so that a variation in the density of the multiple small separate segments of the titanium film 16 defined by the slits 18 permits the waveguide lens 14 to have a desired refractive index distribution.

Figure 4:
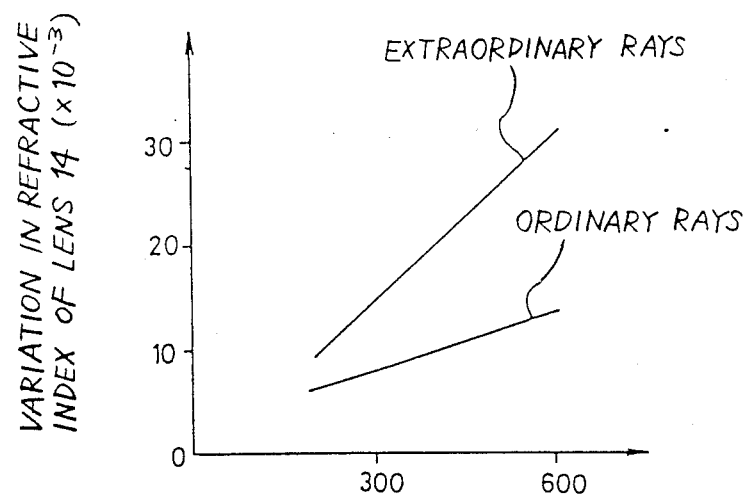
FIG. 4 is a graph representing a relationship between a thickness of a titanium film, and a variation in the refractive index of the waveguide lens formed by diffusion of the titanium film.
Figure 6:
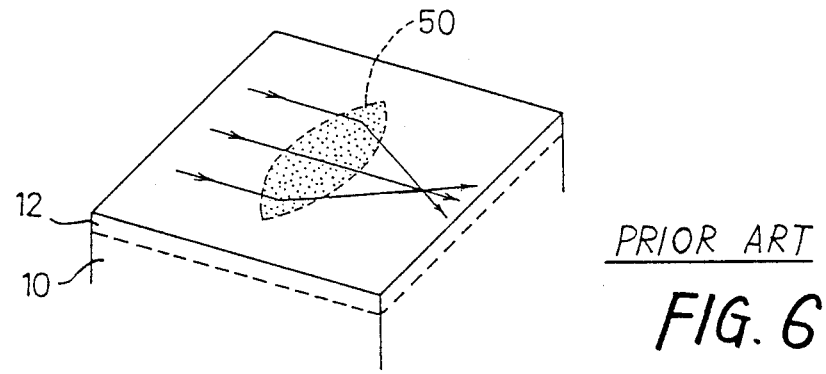
FIG. 6 is a view showing a known mode index lens.
Figure 7:
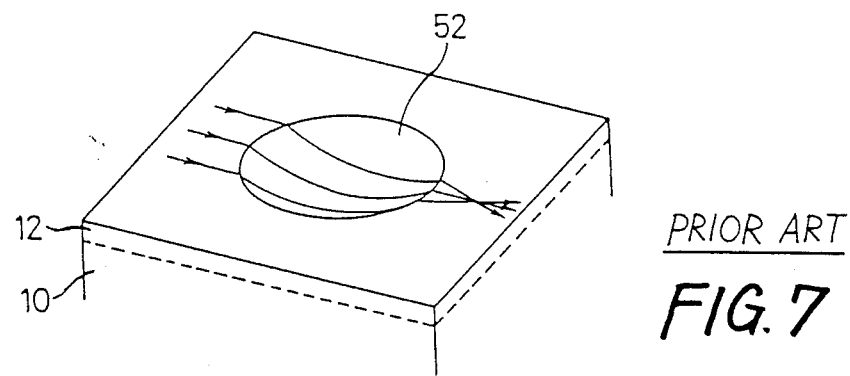
FIG. 7 is a view showing a known geodesic lens.

To effect thermal diffusion of the thin titanium film 16 with the thus formed slits 18 into the substrate 10 (waveguide 12), the substrate 10 with the titanium film 16 deposited thereon is introduced into a suitable furnace (not shown), and heat-treated therein in a suitable atmosphere, whereby the waveguide lens 14 having a predetermined refractive index distribution is obtained. Generally, the diffusion density of titanium within the substrate 10 increases with an increase in the thickness of the thin titanium film 16, as indicated in FIG. 4. Accordingly, a variation of the refractive index of the formed lens 14 increases as the diffusion density increases. It is noted that the titanium of the film 16 diffuses in the direction parallel to the surface of the substrate 10, as well as in the direction of thickness. Therefore, the slits 18 provide an effect that is obtained as if the thickness of the titanium film 16 has a continuously varying thickness which is inversely proportional to the density of the slits 18, i.e., number of the slits 18 per unit length in the direction perpendicular to the centerline 15. Namely, the diffusion density of titanium within the two-dimensional waveguide 12 is continuously varied in inverse proportion with the density of the slits 18 formed in the film 16. For example, the diffusion of the titanium film 16 which has a thickness of 450 angstroms and which does not have slits 18 provides a refractive index variation of $22 \times 10^{-3}$ for extra-ordinary rays of light, while the diffusion of the titanium film 16 having the same thickness and formed with the slits 18 provides a refractive index variation of $11 \times 10^{-3}$ for the extra-ordinary rays, where the slits 18 have a thickness of one (1) micron and spaced apart from each other in increments of two (2) microns. This fact indicates that the diffusion density of titanium in the two-dimensional waveguide 12 and the refractive index of the obtained lens 14 can be continuously changed or varied in the direction perpendicular to the centerline 15, by changing the density of the slits 18, i.e., the number and spacing of the slits 18, in the direction perpendicular to the length of the slits. Thus, the waveguide lens 14 having a desired distribution of refractive index can be formed.

Figure 9:
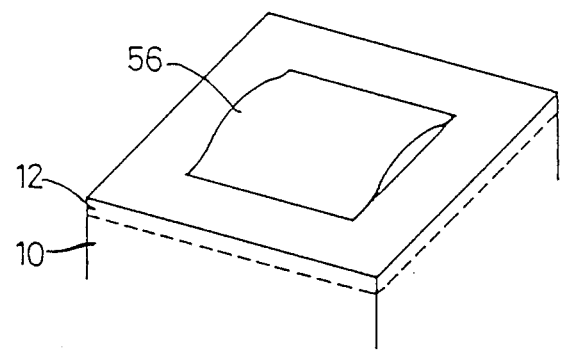
FIG. 9 is a view showing a known method of forming a waveguide lens having a refractive index distribution.

As stated above, the illustrated method of forming the waveguide lens 14 is adapted to continuously change the diffusion density of titanium within the two-dimensional waveguide 12, by varying the number and spacing of the slits 18 formed through the titanium film 16, rather than by using the thin titanium film 56 of FIG. 9 which has a continuously varying thickness. Hence the instant method does not require an accurate control of the thickness of the thin titanium film 16 so that the thickness continuously changes corresponding to a desired distribution of refractive index of the lens 14 to be obtained. This control is very difficult since the thickness of the film 16 is inherently small. Further, the slits 18 can be comparatively readily and precisely formed at the desired positions in the titanium film 16, by a suitable known method such as a photo-etching process. Therefore, the instant method allows easy and accurate large-scale production of the waveguide lenses 14 with a minimum fluctuation in the refractive index distribution from one lens to another.

Moreover, the thickness, number and spacing of the slits 18 can be accurately controlled to desired dimensions on the order of microns. For example, a waveguide lens as small as about 2 mm in width can be easily formed according to the illustrated method of the present invention.

A modified embodiment of the invention will be described. In the interest of brevity and simplification, the same reference numerals as used in the preceding embodiment will be used to identify the corresponding components which appear in the modified embodiment, and no redundant description of these components will be provided.

Figure 5:
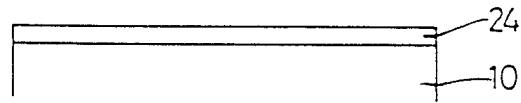
FIGS. 5(a) through 5(e) are views illustrating steps of forming the waveguide lens in a lift-off process according to a modified embodiment of the invention, FIG. 5(a) showing a step of applying a photo resist coating, FIG. 5(b) showing a step of placing a photomask on the photo resist coating, FIG. 5(c) showing a step of developing the exposed areas of the photo resist coating, FIG. 5(d) showing a step of forming a thin metal film, and FIG. 5(e) showing a step of removing the photo resist coating.
Figure 5:
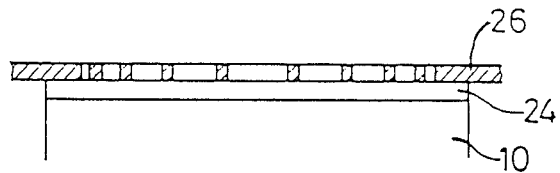
Figure 5:
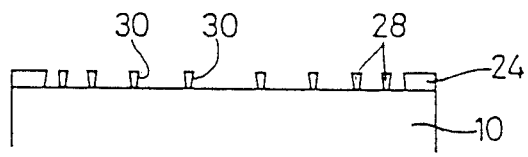
Figure 5:
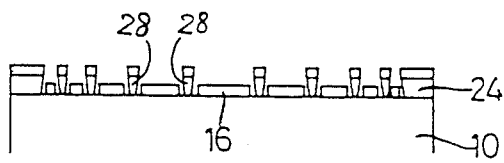
Figure 5:
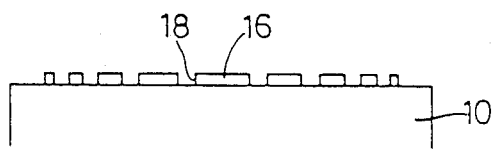
Figure 8:
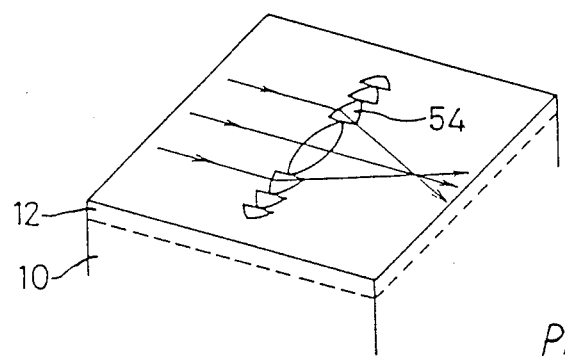
FIG. 8 is a view showing a known fresnel lens.

While the slits 18 are formed in the titanium film 16 after the film 16 is deposited on the substrate 10 according to the preceding embodiment, the method according to the modified embodiment uses a lift-off process for directly forming the thin titanium film 16 with the slits 18 on the substrate 10. Described in greater detail referring to FIGS. 5(a)–5(e), a photo resist coating 24 as well known in the ar is initially applied to the surface of the substrate 10, as illustrated in FIG. 5(a). The applied photo resist coating 24 is dried at about 80° C., and treated (surface-hardened) by a monochlorobenzene so that the adhesion of the coating 24 to the substrate 10, and the surface hardness of the coating 24, are improved. Then, the photo resist coating 24 on the substrate 10 is covered by a photomask 26 which has a predetermined pattern of apertures formed therethrough, as indicated in FIG. 5(b). The photo resist coating 24 is then exposed to ultraviolet rays through the photomask 26. As a result, the exposed areas of the photo resist coating 24 aligned with the apertures in the photomask 26 are exposed to the ultraviolet rays. Subsequently, the photo resist coating 24 is developed. That is, the exposed portions of the photo resist coating 24 are removed, as indicated in FIG. 5(c). In other words, the non-exposed portions of the photo resist coating 24 remain on the surface of the substrate 10, as masking portions 28 which cover corresponding areas of the substrate 10. Since the surface of the photo resist coating 24 was surface-hardened, the remaining masking portions 28 are left in the form of wedges, each of which has a larger thickness at its top face than at its bottom. Thus, FIG. 5(c) shows a masking step for masking spaced-apart parallel regions of the surface of the substrate 10 by the wedge-shaped masking portions 28, such that the masked parallel regions of the substrate 10 correspond to the slits 18 to be formed in the titanium film 16. Namely, the wedge-shaped masking portions 28 define a multiplicity of spaced-apart parallel openings 30 whose density per unit area of the substrate 10 is continuously varied in the direction perpendicular to the direction of length of the openings 30. In the next step, titanium is deposited on the non-masked areas of the surface of the substrate 10, by a sputtering or other suitable thin-film forming method. FIG. 5(d) shows separate segments of the thin titanium film 16 thus formed on the substrate 10. Subsequently, the masking portions 28 of the photo resist coating 24 remaining on the substrate 10 are removed by using a solvent such as acetone, whereby the slits 18 are formed in place of the masking portions 28, as indicated in FIG. 5(e). In this manner, the thin titanium film 16 having the slits 18 as shown in FIG. 3 is formed on the substrate 10.

After the thin titanium film 16 having the slits 18 is formed on the substrate 10, the substrate 10 is introduced into a furnace for effecting thermal diffusion of the titanium film 16 from the surface of the substrate 10 into its interior, in the same manner as described with respect to the preceding embodiment. Hence, the present method using the titanium film 16 provides substantially the same advantages as described before.

A further modified embodiment of the invention will be described.

In this modified method, the desired refractive index distribution of the waveguide lens 14 is obtained by using an ion (proton) exchange process, in place of the diffusion of metals through the substrate 10. Initially, appropriate areas of the surface of the substrate 10 are covered by a masking pattern similar to that shown in FIG. 5(c) which has the masking portions 28. For a masking layer having the masking pattern, a thin titanium film having a high anti-corrosion resistance is used. The masking pattern is formed in a lift-off manner as used in the preceding embodiment. Then, the substrate 10 whose local areas are masked by the masking portions 28 is immersed in a bath of a solution of benzoic acid ($C_6H_5COOH$) maintained at about 240° C., for about 40 minutes, so that the exposed separate areas of the surface of the substrate 10 aligned with the openings 30 are exposed to the solution. Consequently, $Li^+$ ions of the substrate 10 are replaced by $H^+$ ions (protons) of the benzoic acid solution, through the openings 30 of the masking pattern, whereby a layer of $H_xLi_{1-x}NBO_3$ having a high refractive index is formed on the surface of the substrate 10. Then, the benzoic acid is washed away with ethyl alcohol, and the masking material covering the local areas of the substrate 10 is removed by an etchant which consists of one part by volume of HF, one part by volume of $HNO_3$, and 50 parts by volume of $H_2O$. Since the direct replacement of the ions (protons) in the present example does not permit sufficient diffusion of the $H^+$ ions in the crystal of the substrate 10, and since the diffused $H^+$ ions are likely to change in nature, the substrate 10 is subjected to an annealing treatment at 400° C. for about two hours, for example.

In the present modified embodiment, too, the diffusion density of the $H^+$ ions in the two-dimensional waveguide 12 ca be continuously changed by changing the number and spacing of the masking portions (28) of the masking pattern, rather than by continuously changing the thickness of the thin titanium film 56 as shown in FIG. 9. Hence, the instant method does not require continuously changing the thickness of the inherently thin titanium film 16 so that a variation in the thickness exactly corresponds to a desired distribution of refractive index of the lens 14 to be obtained. Further, the slits 18 can be comparatively readily and precisely formed at the desired positions, by a photo-etching process or similar method commonly used in the art. Therefore, the instant method also allows easy and accurate large-scale production of the waveguide lenses 14 with a minimum fluctuation in the refractive index distribution from one lens to another.

Further, the thickness, number and spacing of the slits 18 formed according to the above method can be accurately controlled to desired dimensions on the order of microns, and a comparatively small waveguide lens can be easily produced.

While the present invention has been described in its presently preferred embodiments referring to the accompanying drawings, the invention may be otherwise embodied.

Although the illustrated embodiments have been described in connection with a convex lens whose refractive index (diffusion density of titanium) increases toward the centerline 15, the principle of the invention is applicable to a concave lens whose refractive index decreases toward the centerline.

Further, the substrate 10 may be made of suitable materials other than lithium niobate.

In the illustrated examples, the substrate 10 has the two-dimensional waveguide 12. However, the method according to the invention may be applied to a substrate which is not provided with a two-dimensional waveguide. In this case, the waveguide 12 is formed after the waveguide lens 14 is formed on the substrate 10.

Preferred metallic materials other than titanium, that are diffused in the substrate 10 to form the waveguide lens 14, include niobium (Nb), vanadium (Va), nickel (Ni), copper (Cu) and boron (B). It is noted that boron has a property that causes the refractive index of the substrate to decrease with an increase in the diffusion density. Therefore, if boron is used as the diffusion metal, the distribution of density of the slits 18 must be reversed to that where the other diffusion metals are used.

Although the slits 18 are formed in the film of a diffusion metal in the illustrated embodiments, the principle of the present invention may be otherwise practiced, provided the density of the diffusion metal, or the density of voids such as grooves and holes other than slits formed in the metal film, is continuously changed, in opposite directions, for example, toward the center of the lens.

It is to be understood that the illustrated embodiments and possible changes and modifications have been provided by way of example only, and that various other changes and modifications may be made in the invention, without departing from the spirit of the invention defined in the following claims.

What is claimed is:

1. A method of forming in a two-dimensional waveguide formed on a substrate a waveguide lens having a predetermined distribution of refractive index, for converging or diverging light rays which propagate through said two-dimensional waveguide, comprising the steps of:

forming a film of a diffusion metal having a constant thickness, in a region of a surface of said waveguide on the substrate in which said waveguide lens is to be formed;

forming an etching mask of a photo resist on said film of the diffusion metal, said mask having a multiplicity of separate openings and separate non-open portions defined by said separate openings, said separate openings being formed such that a ratio of an area of said openings to an area of said non-open portions per unit area of said mask is continuously varied in a direction which intersects a direction of propagation of said light rays through said waveguide, said separate openings corresponding to local portions of said film;

effecting an etching operation to remove said local portions of said film which are exposed through said multiplicity of separate openings, so that a density of the removed local portions of said film per unit area of said film is continuously varied in said direction; and effecting thermal diffusion of a remainder of said film into said waveguide on said substrate, such that a density of diffusion of said diffusion metal in said region of said waveguide is continuously varied in said direction, to thereby form said waveguide lens such that the refractive index of the waveguide lens is continuously varied in said direction.

2. A method of forming in a two-dimensional waveguide formed on a substrate a waveguide lens having a predetermined distribution of refractive index, for converging or diverging light rays which propagate through said two-dimensional waveguide, comprising the steps of:

forming a mask in a region of a surface of said waveguide on the substrate in which said waveguide lens is to be formed, said mask being made of a photo resist and having a multiplicity of separate openings and separate non-open portions defined by said separate openings, said separate openings being formed such that a ratio of an area of said openings to an area of said non-open portions per unit area of said mask is continuously varied in a direction which intersects a direction of propagation of said light rays through said waveguide;

applying to a multiplicity of separate exposed areas of said region of the waveguide, which are aligned with said separate openings, a material which serves to change a refractive index of said waveguide, whereby a density of said material in said region is continuously varied in said direction; and effecting thermal diffusion of said material into said waveguide on said substrate, such that a density of diffusion of said material in said region of said waveguide is continuously varied in said direction, to thereby form said waveguide lens such that the refractive index of the waveguide lens is continuously varied in said direction.

3. A method according to claim 2, wherein the step of forming said mask comprises forming a resist coating over said region of the surface of said waveguide on said substrate, covering said resist coating by a photomask which has a multiplicity of masking portions, and removing non-masked portions of said resist coating, to thereby form said mask which has said multiplicity of separate openings defined by the removed portions of said resist coating.

4. A method according to claim 2, wherein the step of applying a material to said multiplicity of separate exposed areas of said region of the waveguide comprises depositing said material on said separate exposed areas.

5. A method of forming in a two-dimensional waveguide formed on a substrate a waveguide lens having a predetermined distribution of refractive index, for converging or diverging light rays which propagate through said two-dimensional waveguide, comprising the steps of:

forming a mask in a region of a surface of said waveguide on the substrate in which said waveguide lens is to be formed, said mask being made of a photo resist and having a multiplicity of separate openings and separate non-open portions defined by said separate openings, said separate openings being formed such that a ratio of an area of said openings to an area of said non-open portions per unit area of said mask is continuously varied in a direction which intersects a direction of propagation of said light rays through said waveguide;

applying to a multiplicity of separate exposed areas of said region of the waveguide, which are aligned with said separate openings, a material which serves to change a refractive index of said waveguide, whereby a density of said material in said region is continuously varied in said direction; and moving ions of said material which serve to change the refractive index of the waveguide into an interior of the waveguide, and moving ions of said waveguide which are exchanged for said material toward said surface of the waveguide, such that a density of diffusion of said material into said interior of the waveguide is continuously varied in said direction, to thereby form said waveguide lens such that the refractive index of the waveguide lens is continuously varied in said direction.

6. A method according to claim 5, wherein the step of applying a material to said multiplicity of separate exposed areas of said region of the waveguide comprises immersing said substrate in a solution containing said material.

7. A method according to claim 5, wherein the step of forming said mask comprises forming a resist coating over said region of the surface of said waveguide, covering said resist coating by a photomask which has a multiplicity of masking portions, and removing non-masked portions of said resist coating, to thereby form said mask which has said multiplicity of separate openings defined by the removed portions of said resist coating.

* * * * *